(12) United States Patent
Tezuka

(10) Patent No.: US 11,314,224 B2
(45) Date of Patent: Apr. 26, 2022

(54) INFORMATION PROCESSING DEVICE AND PROGRAM RECORDING MEDIUM

(71) Applicant: FANUC CORPORATION, Yamanashi (JP)

(72) Inventor: Junichi Tezuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/733,938

(22) Filed: Jan. 3, 2020

(65) Prior Publication Data

US 2020/0249652 A1    Aug. 6, 2020

(30) Foreign Application Priority Data

Feb. 6, 2019    (JP) .............................. JP2019-019796

(51) Int. Cl.
*G05B 19/4063* (2006.01)

(52) U.S. Cl.
CPC ............... *G05B 19/4063* (2013.01); *G05B 2219/36101* (2013.01)

(58) Field of Classification Search
CPC ...... G05B 19/4063; G05B 2219/33127; G05B 2219/36101; G05B 2219/37208; G05B 2219/37212; H04N 5/93
See application file for complete search history.

(56) References Cited

U.S. PATENT DOCUMENTS

| 6,421,571 B1* | 7/2002 | Spriggs | G05B 15/02 345/629 |
| 6,427,099 B1* | 7/2002 | Heinemann | G05B 19/406 700/245 |
| 2005/0278670 A1* | 12/2005 | Brooks | G05B 19/409 703/6 |

(Continued)

FOREIGN PATENT DOCUMENTS

| JP | H05-079951 A | 3/1993 |
| JP | 2001-125612 A | 5/2001 |

(Continued)

OTHER PUBLICATIONS

An Office Action; "Notice of Reasons for Refusal," mailed by the Japanese Patent Office dated Apr. 27, 2021, which corresponds to Japanese Patent Application No. 2019-019796 and is related to U.S. Appl. No. 16/733,938 with English language translation.

(Continued)

*Primary Examiner* — Jennifer L Norton
(74) *Attorney, Agent, or Firm* — Studebaker & Brackett PC

(57) ABSTRACT

An information processing device according to the present invention includes: a numerical data storage unit which stores numerical data related to control or operation of a machine tool that numerically controls a drive axis at every time; an audiovisual information storage unit which stores audiovisual information acquired in the machine tool; and an output control unit which causes the audiovisual information (Continued)

stored in the audiovisual information storage unit to be outputted, while simultaneously causing the numerical data of the time at which acquiring the audiovisual information being outputted to be displayed from among the numerical data stored in the numerical data storage unit.

8 Claims, 3 Drawing Sheets

(56) References Cited

U.S. PATENT DOCUMENTS

| | | | | |
|---|---|---|---|---|
| 2007/0068910 A1* | 3/2007 | Ikeda | ............. | B23K 9/0953 |
| | | | | 219/130.01 |
| 2011/0010623 A1* | 1/2011 | Vanslette | ............. | G06F 3/0485 |
| | | | | 715/704 |
| 2011/0015771 A1* | 1/2011 | Guo | ............. | G05B 19/4063 |
| | | | | 700/97 |
| 2012/0331352 A1* | 12/2012 | Guenther | ............. | G05B 19/0426 |
| | | | | 714/38.1 |
| 2013/0212420 A1* | 8/2013 | Lawson | ............. | G05B 19/4185 |
| | | | | 713/400 |
| 2014/0316573 A1* | 10/2014 | Iwatake | ............. | B25J 9/1697 |
| | | | | 700/258 |
| 2017/0013329 A1* | 1/2017 | Um | ............. | H04N 21/8547 |
| 2019/0303456 A1* | 10/2019 | Lim | ............. | G05B 19/058 |
| 2020/0335064 A1* | 10/2020 | Greco | ............. | H04L 67/2847 |
| 2021/0026330 A1* | 1/2021 | Nakajima | ............. | G05B 19/4069 |

FOREIGN PATENT DOCUMENTS

| | | | |
|---|---|---|---|
| JP | 2003-022108 | A | 1/2003 |
| JP | 2005-190102 | A | 7/2005 |
| JP | 2009-190113 | A | 8/2009 |
| JP | 2011-022688 | A | 2/2011 |
| JP | 2017-152804 | A | 8/2017 |
| JP | 2017-226029 | A | 12/2017 |
| JP | 2018-073185 | A | 5/2018 |

OTHER PUBLICATIONS

An Office Action; "Notice of Reasons for Refusal," mailed by the Japanese Patent Office dated Nov. 24, 2021, which corresponds to Japanese Patent Application No. 2019-019796 and is related to U.S. Appl. No. 16/733,938 with English language translation.

* cited by examiner

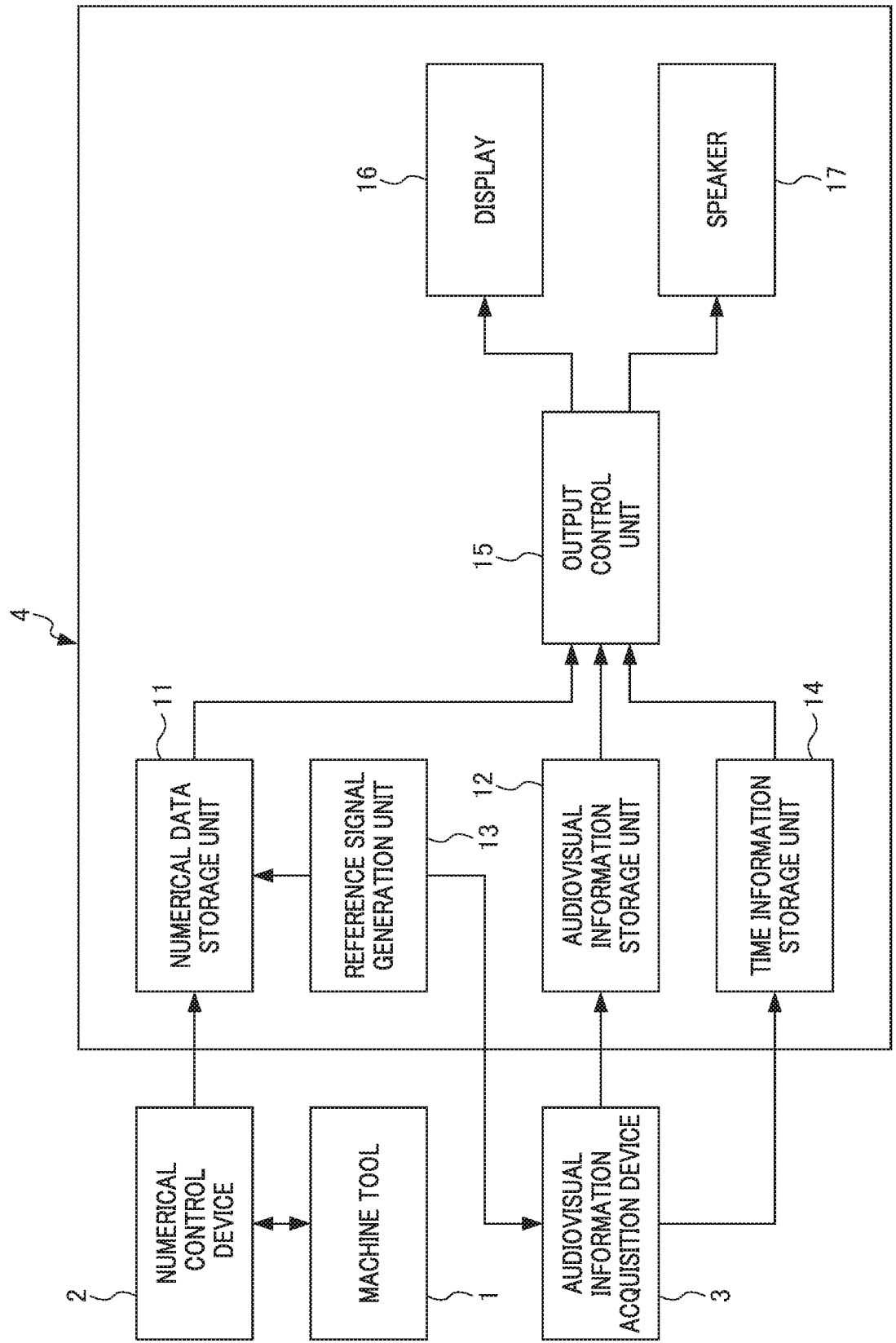

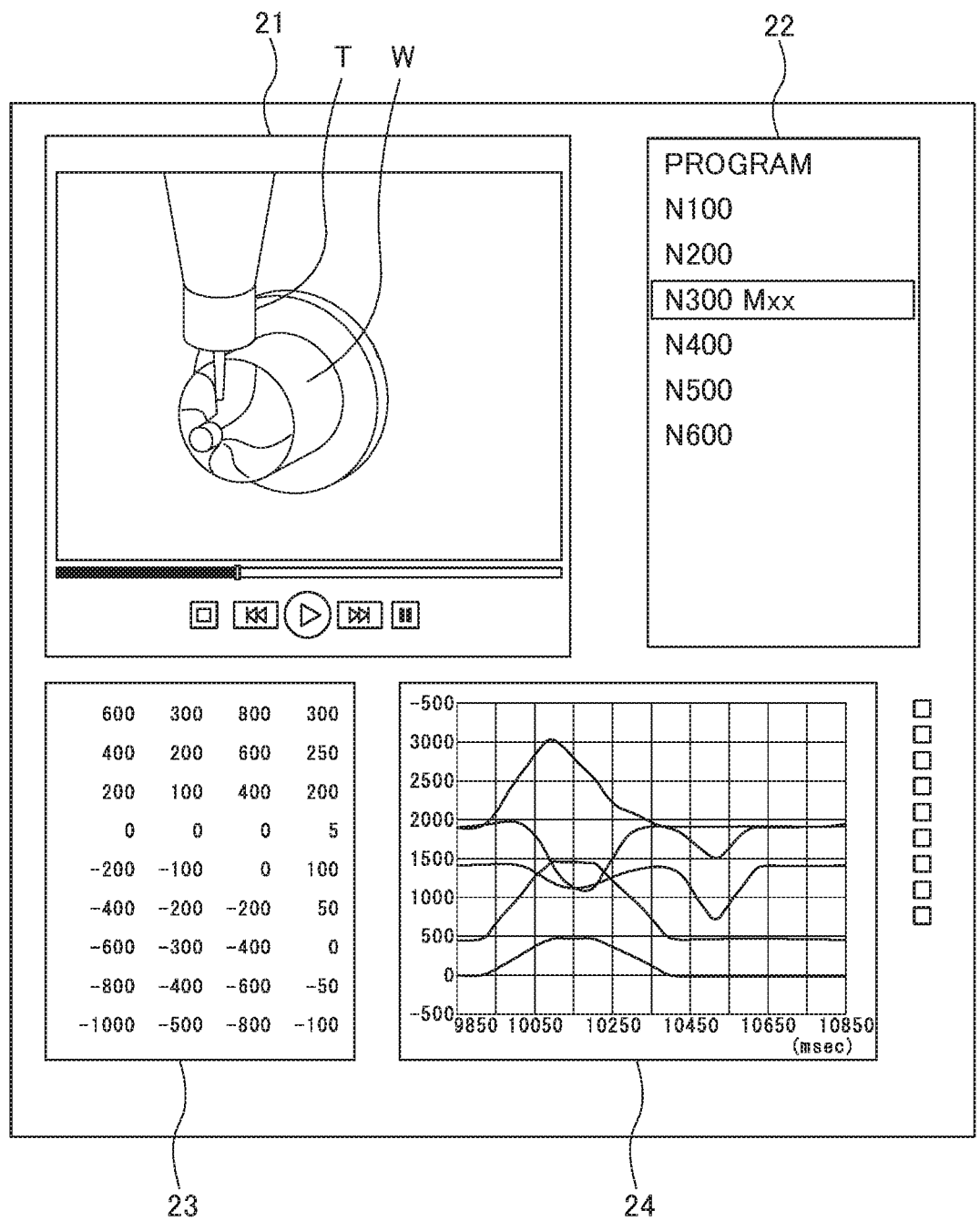

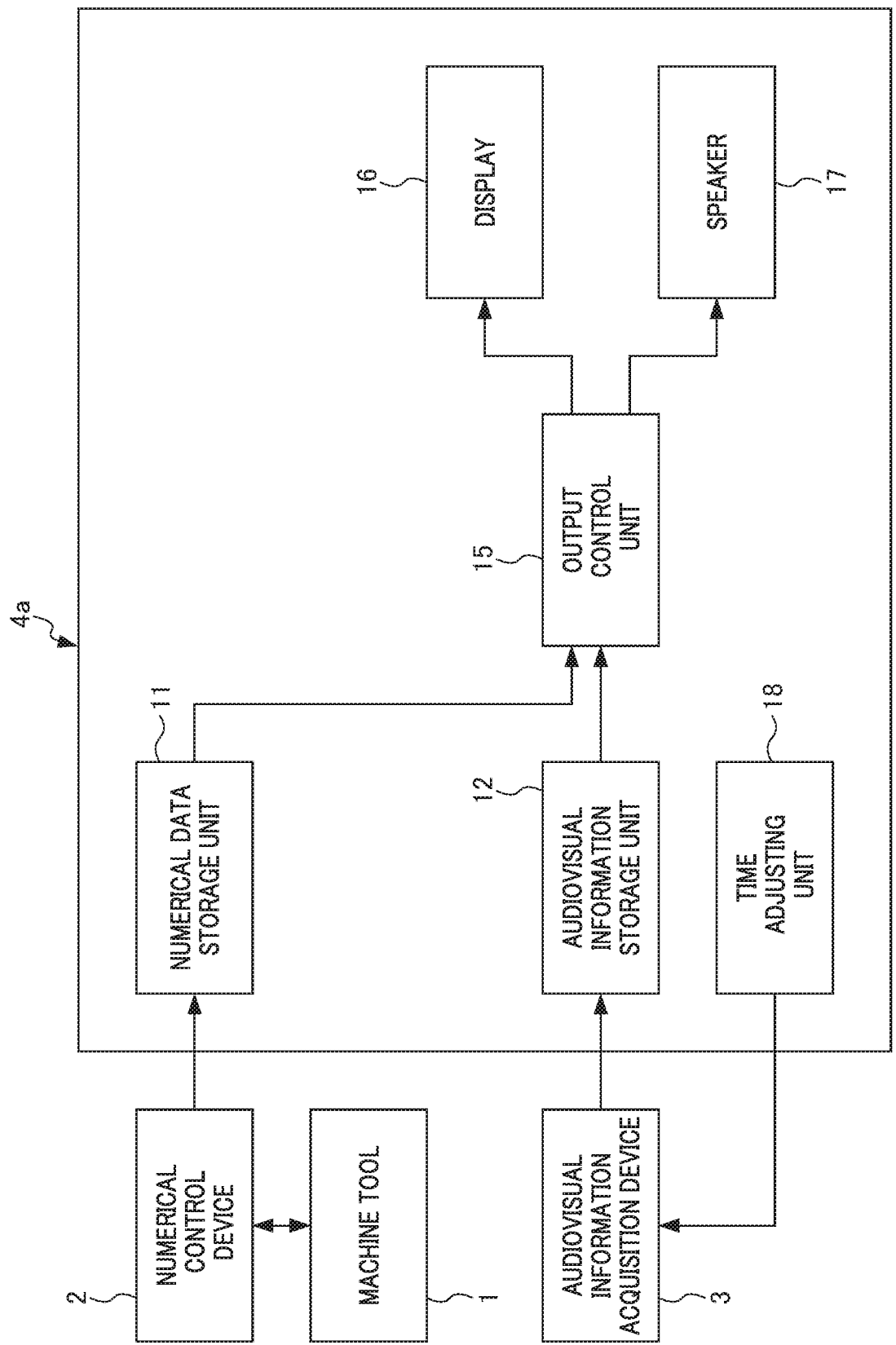

INFORMATION PROCESSING DEVICE AND PROGRAM RECORDING MEDIUM

This application is based on and claims the benefit of priority from Japanese Patent Application No. 2019-019796, filed on 6 Feb. 2019, the content of which is incorporated herein by reference.

BACKGROUND OF THE INVENTION

Field of the Invention

The present invention relates to an information processing device and a program recording medium.

Related Art

Conventionally, in order to confirm the machining process in the machine tool with the drive axes numerically controlled by a numerical control device, an information processing device has been used which displays on a monitor the numerical data (for example, position, speed, etc. that the servomotor driving the drive axis should have) of an input (command signal) from a numerical control device to the machine tool and the numerical data (for example, actual position, speed, torque, electrical current value, etc. of the servomotor) measured at the machine tool; and produces an audio message or the like in a predetermined case based on these sets of numerical data. It should be noted that such an information processing device may be realized as a function of a numerical control device, or may be realized by a personal computer or the like connected to a numerical control device.

In other words, the control of a machine tool aims to cause the machine tool to operate at high precision, as well as monitor the actual operations of the machining process, by converting the state of the machine tool into numerical data. For example, Patent Document 1 discloses technology which enhances the precision of the operation of control of a robot, by measuring the position or posture of a held object retained by a holding device of a robot arm by a visual sensor (camera), i.e. converts to numerical data. In addition, Patent Document 2 discloses technology whereby an operator easily grasps the movement of a tool or the like from numerical data, by providing a display device (information processing device) which displays a plurality of sets of numerical data of a machine tool as a graph on the same time axis.

With the purpose of specifying the occurrence of an abnormality in a machining process and the cause thereof, it is common to carry out constant observation of predetermined numerical data such as the position, speed, electrical current value of a motor driving the machine tool, and accumulate as data. However, there are various events which actually occur in a machining process, and in the case of an event occurring which is difficult to estimate in advance such as tool chatter and chipping, for example, it is difficult to specify so much as the cause thereof, even if the occurrence of an abnormality can be detected from only numerical data related to the driving of the machine tool.

Even in such a case, so long as the operator confirms the state of the machine tool by sight or sound, it may be possible to specify the cause for abnormality relatively easily. However, since it is not practical for an operator to constantly observe the machining process of a machine tool, data such as video and sound capturing an aspect of the machining process is very effective as a means for specifying the true cause.

Patent Document 3 discloses an invention of an abnormality management device of a machine tool constituted of: one or more cameras with an imaging range of a machining region or machine movable part of the machine tool; in the camera, an image data generation unit which generates image data at every predetermined sampling time from images captured by the camera; an operating data acquisition means for acquiring the operating state of a machine tool at each of the predetermined sampling times as operating data from the NC device; an operation record synthesizing means for synthesizing the image data generated by the image data generation unit and operating data corresponding to this image data to synthesize an operation record at a certain point of time; an image file storing the operation record synthesized by the operation record synthesizing means; an image playback means for playing back the operation recording the image file, whereby it is said to be possible to rapidly and accurately carry out a cause analysis in the case of an abnormality occurring in the machine tool by playing back the operation record thereof.

Patent Document 1: Japanese Unexamined Patent Application, Publication No. 2017-226029
Patent Document 2: Japanese Unexamined Patent Application, Publication No. 2011-22688
Patent Document 3: Japanese Unexamined Patent Application, Publication No. 2003-22108

SUMMARY OF THE INVENTION

The device of Patent Document 3 necessitates an image data generation unit which generates image data at every predetermined sampling time. A common video camera cannot perform processing such that generates image data according to the sampling time of the NC device (numerical control device). In the case of capturing images (or sound) of a machine tool using a common video camera, it is not easy to synchronize the captured video data and operating data (numerical data).

The present invention has an object of providing an information processing device and program recording medium which can easily and accurately synchronize and output audiovisual information of video information, audio information or the like in the machining process of the machine tool, with numerical data.

An information processing device (for example, the information processing device 4, 4*a* described later) according to a first aspect of the present invention includes: a numerical data storage unit (for example, the numerical data storage unit 11 described later) which stores, at every time, numerical data related to control or operation of a machine tool that numerically controls a drive axis; an audiovisual information storage unit (for example, the audiovisual information storage unit 12 described later) which stores audiovisual information at least including either of image information and audio information acquired in the machine tool; and an output control unit (for example, the output control unit 15 described later) which outputs the audiovisual information stored in the audiovisual information storage unit, while simultaneously displaying the numerical data of the time at which acquiring the audiovisual information being outputted, from among the numerical data stored in the numerical data storage unit. According to this configuration, the information processing device can simply and accurately output simultaneously the audiovisual information and numerical information by including the output control unit. In the case of there being an abnormality in the machining process, the information processing device can thereby synchronize the numerical data when an abnormality occurred and the audiovisual information and present to the operator; therefore, the operator can relatively easily specify the cause of the abnormality.

According to a second aspect of the present invention, the information processing device as described in the first aspect may further include: a reference signal generation unit (for example, the reference signal generation unit 13 described later) which generates a reference signal indicating a reference time; and a time information storage unit (for example, the time information storage unit 14 described later) which stores a time at which the reference signal was generated in an internal time of the audiovisual information, in which the numerical data storage unit may store a value of the reference signal together with the numerical data, and the output control unit may synchronize the audiovisual information and the numerical data based on the time stored by the time information storage unit and the value of the reference signal stored by the numerical data storage unit. By using the reference signal in this way, it is possible to easily synchronize the audiovisual information and numerical data.

According to a third aspect of the present invention, in the information processing device as described in the first or second aspect, the output control unit may display the numerical data as a graph showing a numerical change relative to a time axis, and display on the graph a cursor indicating the time at which acquiring the audiovisual information being outputted. By displaying the numerical data as a graph, the operator tends to intuitively grasp the numerical data, whereby the operator can easily grasp the numerical data corresponding to the audiovisual information outputted by the cursor displayed on the graph.

According to a fourth aspect of the present invention, in the information processing device as described in any one of the first to third aspects, the audiovisual information may include an image of a workpiece or a tool. By outputting an image of a workpiece or tool which are important in the machining process and in which an abnormality tends to occur, specification of the abnormality cause of a machining process by the operator can be made easier.

According to a fifth aspect of the present invention, in the information processing device as described in any one of the first to fourth aspects, the audiovisual information may include sound. Since it is thereby possible for the operator to confirm a strange noise due to chatter or the like, the specification of the abnormality cause of the machining process becomes easier.

According to a sixth aspect of the present invention, in the information processing device as described in any one of the first to fifth aspects, the output control unit may display a machining program, and may highlight a portion of the machining program being displayed which corresponds to the time at which acquiring the audiovisual information being outputted. Since it is thereby possible to confirm an operation planned by a machining program during abnormality occurrence, specification of an abnormality cause in a machining process by the operator can be made easier.

A program recording medium according to a seventh aspect of the present invention is a program recording medium which non-transitorily records a program for confirming a machining process in a machine tool that includes a drive axis which is numerically controlled, the program including: a numerical data storage processing element which stores numerical data related to control or operation of the machine tool at every time; an audiovisual information storage processing storage processing element which stores audiovisual information that includes at least either of image information and audio information acquired in the machine tool; and an output control processing element which causes the audiovisual information stored by the audiovisual information storage processing element to be outputted, while simultaneously causing the numerical data of the time at which acquiring the audiovisual information being outputted to be displayed from among the numerical data stored by the numerical data storage processing element. According to this configuration, in the case of there being an abnormality in the machining process, since it is possible to synchronize the numerical data when the abnormality occurred and the audiovisual information and present to the operator, it is possible to configure the information processing device which facilitates the specification of the abnormality cause by the operator.

The information processing device according to the present invention allows an operator to easily specify the cause of an abnormality in a machining process of a machine tool.

BRIEF DESCRIPTION OF THE DRAWINGS

FIG. 1 is a block diagram showing the configuration of a machining system having an information processing device according to an embodiment of the present invention;

FIG. 2 is a schematic diagram illustrating a display screen of the information processing device in FIG. 1; and FIG. 3 is a block diagram showing the configuration of a machining system having an information processing device according to an embodiment differing from that in FIG. 1 of the present invention.

DETAILED DESCRIPTION OF THE INVENTION

Hereinafter, embodiments of the present invention will be explained while referencing the drawings. FIG. 1 is a block diagram showing the configuration of a machining system having an information processing device according to an embodiment of the present invention.

The machining system in FIG. 1 includes: a machine tool 1 having a plurality of drive axes; a numerical control device 2 which numerically controls the plurality of drive axes of the machine tool; an audiovisual information acquisition device 3 which acquires audiovisual information in the machine tool; and an information processing device 4 according to an embodiment of the present invention.

As the machine tool 1, it is possible to establish as a machine tool having any configuration; however, typically, it is said to be a machine tool in which a plurality of drive axes is respectively driven by servomotors.

The numerical control device 2 can be established as a well-known drive which controls the servomotors of each drive axis, etc. in accordance with a machining program (for example, G code). For example, such a numerical control device 2 can be configured as a computer device having a CPU, memory, etc.

As the audiovisual information acquired by the audiovisual information acquisition device 3 is information whereby a person confirms by sight or sound, and image information such as a plurality of still images photographed at intervals, or a moving image continuously photographed, audio information, etc. can be exemplified thereas. In other words, the audiovisual information includes at least either image information or audio information.

The audiovisual information acquisition device 3 is a device which converts the audiovisual information into storable data, and can be established as a device which acquires audiovisual information at a fixed sampling period and converts into data. The audiovisual information acquisition device 3 is typically said to be a video camera (preferably having a microphone). As the generated by the audiovisual information acquisition device 3 converting audiovisual information, it is possible to establish as video data including capturing start time information, a plurality of still image data respectively including image time information, audio data including recording start time information, etc. As the sampling period of audiovisual information, in the case of being video data, for example, it can be set as 30 fps, and in the case of being audio data, for example, it can be set as 48 kHz. In the case of the audiovisual information including video data and audio data, normally, both sampling periods are said to differ.

The audiovisual information acquired by the audiovisual information acquisition device 3 preferably includes images of the workpiece to be machined in the machine tool 1 and the tool machining the workpiece. By the audiovisual information including images of important workpieces or tools in the machining process of the machine tool 1 in this way, the operator comes to easily discover the cause for the occurrence of malfunction, etc. In addition, it is also preferable for the audiovisual information acquired by the audiovisual information acquisition device 3 to include sound. By the audiovisual information including sound, it becomes possible for an operator to discover an abnormality cause based on an irregular noise.

The audiovisual information acquisition device 3 has an internal clock independent from the numerical control device 2 and information processing device 4, and when a predetermined reference signal is inputted from outside, is configured so as to output the internal time of this moment.

The information processing device 4 is a numerical processing device which can be used in order to confirm a machining process of the machine tool which numerically controls drive axes. The information processing device 4 includes: a numerical data storage unit 11 which stores numerical data related to control or operation of the machine tool at every time; an audiovisual information storage unit 12 which stores audiovisual information acquired in the machine tool; a reference signal generation unit 13 which generates a reference signal indicating a reference time; a time information storage unit 14 which stores the time at which the reference signal of an internal time of the audiovisual information is generated; and an output control unit 15 which outputs (plays back) audiovisual information stored in the audiovisual information storage unit 12, while simultaneously causing the numerical data of the time at which the audiovisual information acquisition device 3 acquired the audiovisual information being outputted from among the numerical data stored in the numerical data storage unit 11 to be displayed. In addition, the information processing device 4 further includes a playback device (display 16 and speaker 17) controlled by the output control unit 15, and outputting audiovisual information.

The information processing device 4 can be realized by reading a program related to an embodiment of a program of the present invention into a computer device having a CPU, memory, etc. In other words, the numerical data storage unit 11, audiovisual information storage unit 12, reference signal generation unit 13, time information storage unit 14 and output control unit 15 of the information processing device 4 are respectively realized by parts of the program (for example, subroutines or the like). Therefore, these constituent elements are simply distinguished in a functionally manner, and not necessarily constituent elements which are physically independent, and there is also no requirement to be written in the program separately from each other. It should be noted that the program according to the present invention can be provided by recording in a non-transitory recording medium.

The information processing device 4 may be configured from an independent computer device; however, it may be configured integrally with the numerical control device 2. In other words, the program for realizing the information processing device 4 may be part of a program for realizing the numerical control device 2, and the display 16 and speaker 17 may also serve as the display and speaker of the numerical control device 2.

The numerical data storage unit 11 stores numerical data at a fixed time interval. The time interval of the numerical data is set to a micro-time in which continuous control (scan of program) of the machine tool 1, numerical control device 2 and information processing device 4 is possible.

As the numerical data related to control of the machine tool 1 stored by the numerical data storage unit 11, the sequence number in a machining program executed at each time, command issued to the machine tool 1 at each time (for example, speed command data of servos, etc.) and the like can be included. As the numerical data related to operation of the machine tool 1 stored by the numerical data storage unit 11, data measured at the machine tool (for example, feedback values such as position, speed, electrical current and torque of servos, and, for example, any measured values such as concentration and temperature of cutting oil) can be included.

The time of the numerical data stored by the numerical data storage unit 11 may be the time in the internal time of the numerical control device 2, or may be the time in the internal time of the information processing device 4 independent from the numerical control device 2.

The numerical data storage unit 11 preferably stores the numerical data according to the control cycle of the numerical control device 2, and may also serve as a storage means within the numerical control device 2. In addition, the numerical data storage unit 11 may be a storage unit which reads out and temporarily stores the necessary data from among numerical data stored by the numerical control device 2, upon displaying the numerical data by an output control unit 15 described later.

The numerical data storage unit 11, in addition to the numerical data obtained from the numerical control device 2 and information processing device 4, records values of reference signals (usually digital data) generated by the reference signal generation unit 13 described later. In the case of the numerical data storage unit 11 reading out and temporarily storing numerical data stored by the numerical control device 2 as necessary, the value of the reference signal is stored simultaneously with other numerical data by the numerical control device 2.

The audiovisual information storage unit 12 stores data of audiovisual information acquired by the audiovisual information acquisition device 3. The audiovisual information storage unit 12 may store audiovisual information at a different period than the sampling period of the audiovisual information acquisition device 3, i.e. may thin out and store information. In addition, the audiovisual information storage unit 12 may be a storage unit that reads out and temporarily stores the necessary audiovisual information from among the audiovisual information stored by the audiovisual information acquisition device 3, upon outputting the audiovisual information by the output control unit 15 described later.

The audiovisual information storage unit 12 stores the audiovisual information in any format selected according to the type thereof. As the format of the audiovisual information, as examples, it is possible to exemplify MPEG, AVI, etc. in the case of being video, JPEG, BMP, etc. in the case of being still images, and MP3, AAC, WMA, etc. in the case of being audio.

The reference signal generation unit 13 generates a reference signal indicating a reference time at a fixed time interval, or by one time after starting one machining process. The reference signal can be established as a pulse signal. The reference signal generation unit 13 inputs the generated reference signal to the numerical data storage unit 11 and audiovisual information acquisition device 3.

The time information storage unit 14 stores the time of the moment in the internal time of the audiovisual information acquisition device 3 outputted by the audiovisual information acquisition device 3 to which the reference signal was inputted from the reference signal generation unit 13.

The output control unit 15 outputs the audiovisual information stored in the audiovisual information storage unit 12, and more specifically, plays back the video in the audiovisual information by way of the display 16, and plays back the audio in the audiovisual information by the speaker 17. At the same time, the output control unit 15 causes the numerical data of the time at which acquiring the audiovisual information being outputted from among the numerical data stored in the numerical data storage unit 11 to be displayed on the display 16.

In this way, the information processing device 4 plays back the audiovisual information such as video and sound acquired at the machine tool 1 by the output control unit 15, and causes the numerical information to be displayed on the display 16 synchronously with the audiovisual information. For this reason, in the case of a malfunction occurring the machining process of the machine tool 1, the operator can relatively easily specify the cause thereof by referencing the audiovisual information.

The output control unit 15 synchronizes the audiovisual information outputted and the numerical data displayed based on the time stored by the time information storage unit 14 and the value of the reference signal stored by the numerical data storage unit 11. More specifically, the output control unit 15 extracts the time at which the reference signal was inputted in the data stored by the numerical data storage unit 11 (time at which the value of the reference signal became 1), and calculates the difference from the time stored by the time information storage unit 14. Then, so as to close this gap, by shifting the acquisition time of the audiovisual information or the acquisition time of the numerical data, the output control unit 15 displays the numerical data of time at which acquiring the audiovisual information being outputted.

In the case of the reference signal being outputted multiple times, at every time of the time stored by the time information storage unit 14 (time at which the reference signal was inputted to the audiovisual information acquisition device 3 in the internal time of the audiovisual information), processing may be performed for closing the gap with the closest time to the time stored by the time information storage unit 14 among the times at which the reference signal was outputted in the data stored by the numerical data storage unit 11.

In this way, by using the reference signal generated by the reference signal generation unit 13 to adjust the time, i.e. compensating the difference between the internal time of the audiovisual information and the time of the numerical data, since it is possible for the operator to more accurately grasp the occurrence time of an abnormality, the cause of the abnormality can be more easily specified.

In addition, by repeating the specification of abnormality cause based on the audiovisual information using the information processing device 4, there is a possibility of being able to find the corresponding relationship between abnormality and numerical data. In other words, the information processing device 4 has a possibility of being able to enable specification of abnormality and the cause thereof which could not be specified thus far in numerical data, from the numerical data.

FIG. 2 shows an example of a screen displayed on the display 16 by the output control unit 15. As illustrated, the output control unit 15 may be configured so as to set in the display 16, a video display region 21 for displaying a video; a machining program display region 22 for displaying at least part of a program such as the sequence number (line number) of a machining program; numerical display sequence 23 for displaying numerical data stored in the numerical data storage unit 11 by characters; and a graph display region 24 for displaying the numerical data stored in the numerical data storage unit 11 as a graph showing the numerical change relative to a time axis.

The video which can be visually recognized by the operator from the video data stored in the audiovisual information storage unit 12 is played back by outputting to the video display region 21. In other words, the video display region 21 is a display region which plays back the video stored in the audiovisual information storage unit 12. With the example shown in FIG. 2, images of the workpiece W and tool T are included in the image being displayed in the video display region 21.

This video display region 21 is preferably configured, similarly to general video playback software for a personal computer, to display the playback position thereof (time at which acquiring video) to allow confirmation, and so that an operator can arbitrarily select the playback speed and position thereof.

At least part of the machining program (portion executed by the numerical control device 2 at the time at which the video played back in the video display region 21 was acquired, and portion before and after this) is displayed in the machining program display region 22. More specifically, the machining program display region 22 can be established as a display scrolling (erasing words of older time and adding words of newer time) the program displayed together with the progress of playback of the audiovisual information.

In addition, the display of the machining program display region 22 is preferably highlighting (for example, displaying so as to enable easy recognition of a portion by changing the color of characters or background) the portion corresponding to the time at which an image displayed on the video display region 21 (1 frame of video) is acquired (for example, sequence number and/or word executed at this time). When an operator confirms an abnormality in the video display region 21, since it is thereby possible to easily confirm the command of a program executed when an abnormality occurred, an operator more easily specifies the cause of the abnormality.

Numerical data such as of a servomotor is displayed in the numerical display region 23. This display can be established as displaying numerical data of multiple times closest to the time at which acquiring the audiovisual information being outputted (image displayed in the video display region 21). The display of this numerical display region 23 displays numerical data sampled at the same time on the same line, and can be established as a display scrolling (erasing words of older time and adding words of newer time) numerical data displayed together with the progress of playback of audiovisual information. In addition, the numerical data of time corresponding to the audiovisual information being outputted may be highlighted.

The numerical data is displayed graphically in the graph display region 24. By displaying the numerical data graphically, an operator tends to understand the change over time of the numerical data. The display of this graph display region 24 is preferably designed to enable adjusting of the scrolling of this axis in order for an operator to confirm minute fluctuations in numerical values. In addition, the display of the graph display region 24 may be designed so that an operator can select the type of numerical data being graphically displayed.

The graph display region 24 is preferably designed so as to display a cursor (for example, line traversing the graph) indicating the time at which acquiring audiovisual information being outputted on a graph. It is thereby possible to more easily confirm numerical data of the time at which the audiovisual information is outputted. In addition, the cursor displayed on the graph may be designed such that adjustment of the playback position of the audiovisual information, and changing of the time of data displayed in the machining program display region 22 and numerical display region 23 are possible, by an operator causing to move on the screen using an input device such as a mouse, for example.

The output control unit 15 may be configured so as detect an abnormality, etc. from the numerical data, and output information of the time at which the abnormality, etc. was detected on the display regions 21, 22, 23, 24, respectively.

The display 16 may be configured from a liquid crystal display panel, organic EL display panel, etc., and externally attached to the information processing device 4.

A speaker 17 may be built into the information processing device 4, may be a device such an earphone or headphones connected to the information processing device 4, or may be an external speaker connected via an amplifier which generates or amplifies an electrical signal based on the signal outputted from the information processing device 4.

As is evident from the above explanation, an embodiment of a program according to the present invention realizing the information processing device 4 is a program for confirming a machining process in the machine tool 1 equipped with drive axes which are numerically controlled, and includes: a numerical data storage processing element (program element which performs processing related to the numerical data storage unit 11) which stores numerical data related to control or operation of the machine tool 1 at every time; an audiovisual information storage processing element which stores audiovisual information acquired in the machine tool 1 (program element which performs processing related to the audiovisual information storage unit 12); an output control processing element causes the audiovisual information stored by the audiovisual information storage processing element to be outputted, while simultaneously causing the numerical data of the time at which acquiring the audiovisual information being outputted was acquired from among the numerical data stored by the numerical data storage processing element to be displayed (program element which performs processing related to the output control unit 15).

FIG. 3 shows the configuration of a machining system which includes an information processing device 4a related to a different embodiment from FIG. 1 of the present invention.

The machining system in FIG. 3 includes: the machine tool 1 having a plurality of drive axes; the numerical control device 2 which numerically controls the plurality of drive axes of the machine tool; the audiovisual information acquisition device 3 which acquires audiovisual information in the machine tool; and the information processing device 4a. The machine tool 1, numerical control device 2 and audiovisual information acquisition device 3 of the machining system in FIG. 3 can be configured similarly to the machine tool 1, numerical control device 2 and audiovisual information acquisition device 3 of the machining system in FIG. 1. In the following explanation, the same reference symbols are attached to constituent elements which are the same as the constituent elements previously explained, and redundant explanations are omitted.

The information processing device 4a is an information processing device that can be used for confirming the machining process in the machine tool numerically controlling the drive axes. The information processing device 4a further includes: a numerical data storage unit 11 which stores numerical data related to control or operation of the machine tool at every time; an audiovisual information storage unit 12 which stores audiovisual information acquired at the machine tool; a time adjusting unit 18 which synchronizes the internal time of the audiovisual information acquisition device 3 with the internal time of the numerical control device 2 or information processing device 4a, which is the reference for the time in the numerical data stored by the numerical data storage unit 11; an output control unit 15 which outputs the audiovisual information stored in the audiovisual information storage unit 12, while at the same time displaying the numerical data of the time at which the audiovisual information acquisition device 3 acquired the audiovisual information being outputted from among the numerical data stored in the numerical data storage unit 11; and the display 16 and speaker 17 outputting the audiovisual information.

The numerical data storage unit 11, audiovisual information storage unit 12, output control unit 15, display 16 and speaker 17 of the information processing device 4a in FIG. 3 are the same as the numerical data storage unit 11, audiovisual information storage unit 12, output control unit 15, display 16 and speaker 17 of the information processing device 4 in FIG. 1.

The time adjusting unit 18 causes the internal time of the audiovisual information acquisition device 3 to match the time (internal time of the numerical control device 2 or information processing device 4) of the instant recorded in the numerical data storage unit 11, immediately before starting the machining process (control of the machine tool 1 by the numerical control device 2), for example. As a specific example, the machining system may be configured so as that the numerical control device 2 transmits a preparation signal to the time adjusting unit 18 before starting the machining process; the time adjusting unit 18 having received the preparation signal sets the internal time of the audiovisual information acquisition device 3, and then transmits a confirmation signal to the numerical control device 2; and the numerical control device 2 receives the confirmation signal of the time adjusting unit 18, and then starts the machining process.

Although an embodiment of the present invention has been explained above, the present invention is not to be limited to the aforementioned embodiment. In addition, the effects described in the present embodiment are merely listing the most preferred effects produced from the present invention, and the effects from the present invention are not limited to those described in the present embodiment.

In the information processing device of the present invention, the means for synchronously outputting the audiovisual information and numerical data may employ different means from the above-mentioned embodiment. As an example, by writing the time at which receiving the reference signal in the file header of video data, and providing a bit indicating the value of the reference signal in the frame header of the video, the video and numerical data may be synchronized. In addition, the information processing device of the present invention may be configured so that a shift is not produced between the internal time of the audiovisual information and the internal time of the numerical data, by including an audiovisual information acquisition device (for example, video camera or the like) which operates at the internal time which is the same as the time stored by the numerical data storage unit.

EXPLANATION OF REFERENCE NUMERALS 1 machine tool
2 numerical control device
3 audiovisual information acquisition device
4, 4a information processing device
11 numerical data storage unit
12 audiovisual information storage unit
13 reference signal generation unit
14 time information storage unit
15 output control unit
16 display
17 speaker
18 time adjusting unit

What is claimed is:
1. An information processing device, comprising:
a memory; and
a processor coupled to the memory, the processor being configured to:
store, at a plurality of times, numerical data related to control or operation of a machine tool that numerically controls a drive axis;
store audiovisual information including at least one of image information and audio information of the machine tool;
generate a reference signal indicating a reference time;
store a time of an internal time, from an internal clock of an audiovisual information acquisition device, at which moment the reference signal was generated;
store a value of the reference signal together with the numerical data;
synchronize the audiovisual information and the numerical data based on the stored time and the stored value of the reference signal; and
output the synchronized audiovisual information, while simultaneously displaying the synchronized numerical data of a time, of the plurality of times, corresponding to the outputted audiovisual information, from among the stored numerical data.
2. An information processing device, comprising:
a memory; and
a processor coupled to the memory, the processor being configured to:
store, at a plurality of times, numerical data related to control or operation of a machine tool that numerically controls a drive axis;
store audiovisual information including at least one of image information and audio information of the machine tool;
generate a reference signal indicating a reference time;
input the reference signal to an audiovisual information acquisition device that acquires the audiovisual information and is configured to output an internal time of a moment in which the reference signal is inputted;
store the internal time outputted by the audiovisual information acquisition device;
store a value of the reference signal together with the numerical data;
synchronize the audiovisual information and the numerical data based on the stored internal time and the stored value of the reference signal; and
output the synchronized audiovisual information, while simultaneously displaying the synchronized numerical data of a time, of the plurality of times, corresponding to the outputted audiovisual information, from among the stored numerical data.
3. The information processing device according to claim 1, wherein the processor is further configured to display the numerical data as a graph showing a numerical change relative to a time axis, and display on the graph a cursor indicating the time corresponding to the outputted synchronized audiovisual information.
4. The information processing device according to claim 1, wherein the audiovisual information includes an image of a workpiece or a tool.
5. The information processing device according to claim 1, wherein the audiovisual information includes sound.
6. The information processing device according to claim 1, wherein the processor is further configured to display a machining program, and highlights a portion of the machining program being displayed which corresponds to the time corresponding to the outputted synchronized audiovisual information.
7. A non-transitory program recording medium which records a program for confirming a machining process of a machine tool that includes a drive axis which is numerically controlled, the program comprising:
a numerical data storage processing element which stores numerical data related to control or operation of the machine tool at a plurality of times;
an audiovisual information storage processing element which stores audiovisual information that includes at least one of image information and audio information of the machine tool;
a reference signal generation element which generates a reference signal indicating a reference time;
a time information storage element which stores a time of an internal time, from an internal clock of an audiovisual information acquisition device, at which moment the reference signal was generated;
the numerical data storage processing element stores a value of the reference signal together with the numerical data;
an output control processing element synchronizes the audiovisual information and the numerical data based on the stored time and the stored value of the reference signal; and
the output control processing element which causes the synchronized audiovisual information stored by the audiovisual information storage processing element to be outputted, while simultaneously causing the synchronized numerical data of a time, of the plurality of times, corresponding to the outputted audiovisual information to be displayed from among the numerical data stored by the numerical data storage processing element.

8. The non-transitory program recording medium according to claim 7, wherein the reference signal generation element also inputs the reference signal to the audiovisual information acquisition device that acquires the audiovisual information and is configured to output an internal time of a moment in which reference signal is inputted; and the time information storage element stores the internal time outputted by the audiovisual information acquisition device.

* * * * *